Oct. 29, 1968  B. L. DAVIS  3,408,025
EMERGENCY EVACUATION SYSTEM
Filed Jan. 3, 1967
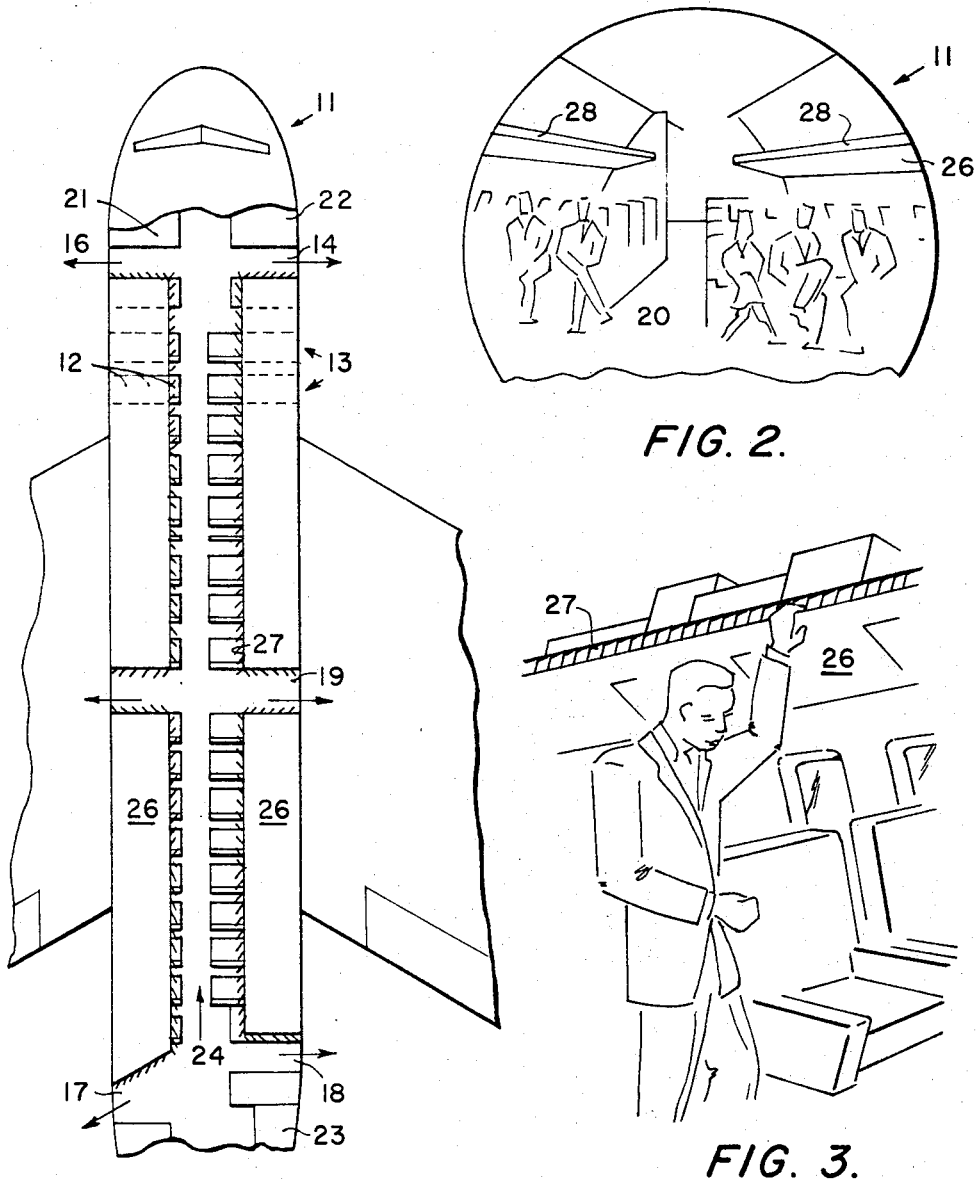
FIG. 1.
FIG. 2.
FIG. 3.
FIG. 4.
INVENTOR.
BURT L. DAVIS
BY 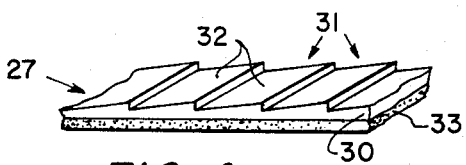
ATTORNEYS 3,408,025
EMERGENCY EVACUATION SYSTEM
Burt L. Davis, 701 Channing Ave.,
Palo Alto, Calif. 94301
Filed Jan. 3, 1967, Ser. No. 606,859
8 Claims. (Cl. 244—118)

ABSTRACT OF THE DISCLOSURE

An emergency evacuation path marking system employing a strip of material having a tactile characteristic whereby the strip forms a tactile path presenting greater resistance to sliding movement of the fingertips in one direction than in the other. The strip, if followed in the low resistance direction, leads to an evacuation exit or station.

Background of the invention

This invention relates to an emergency evacuation guide system defining a tactile path serving to direct passengers or crew to evacuation stations of a personnel carrier such as an airplane, ship or the like and is particularly useful where the interior of the carrier has been filled with smoke to the point where passengers attempting to escape a compartment must rely solely on their sense of touch.

In disasters such as airplane crashes, ship fires and the like where a passenger compartment fills with smoke, for example, passengers become very easily disoriented and have difficulty in finding a proper escape exit or other evacuation station.

Summary of the invention and objects

It is a general object of the present invention to provide an arrangement whereby under such conditions a person will be directed properly to an exit or evacuation station.

It is a further object of the invention to provide an emergency evacuation guide strip having a tactile characteristic which, when touched, can serve to direct a person in a given direction.

These and other objects of the invention will become more readily apparent from the following detailed description of a preferred embodiment, when considered in conjunction with the accompanying drawings.

In general, there is disclosed herein an emergency evacuation guide for forming a path adapted to direct personnel carried in a personnel carrier to evacuation stations thereof. A continuous length of material, having one surface adapted to be secured to an interior surface portion of the carrier, is readily disposed within reach of passengers within the carrier. The length of materials extends directionally toward one of the evacuation stations. The exposed surface of the material, within reach of personnel within the carrier, provides a tactile characteristic which serves to indicate a given direction to be followed in evacuating the carrier.

Thus, the exposed surface permits a passenger's fingertips to slide readily in one direction while providing considerable resistance to sliding contact in an opposite direction. The passenger, seeking an exit, follows the strip in the direction of relatively low resistance.

Brief description of the drawing

FIGURE 1 shows, in plan view, the seating diagram of the fuselage of an airplane;

FIGURE 2 is an elevation view, in section, showing the interior of a fuselage portion of an airplane according to the invention;

FIGURE 3 is a perspective view of a portion of the passenger compartment of an airplane, according to the invention; and FIGURE 4 is an enlarged detail view, in perspective, showing a tactile strip according to the invention.

Description of the preferred embodiments

Referring to the drawings, an aircraft fuselage 11 of conventional design having seats 12 arranged in a number of rows 13 includes emergency exits 14, 16, 17, 18 and 19. Utility spaces such as lavatories 21, galley spaces 22, and coat closets 23 have been provided at the front and rear of the passenger compartment 20 of fuselage 11. Seats 12 are arranged in two groups to form an aisle 24 whereby passengers may load either from the front or rear of the aircraft.

Luggage shelves 26 extend along the passenger compartment 20 above the seats and adjacent to aisle 24. Luggage shelves 26 normally serve to accommodate blankets, pillows, and very small parcels for the convenience of the passengers seated nearby.

A strip of material 27 adhered to an interior surface of compartment 20, such as the edges 28 of shelves 26 which extend along and are adjacent to aisle 24, serves to dispose a directional tactile surface within ready reach of a passenger in aisle 24.

The strip 27 of material comprises a layer 30 of material of a type providing substantially greater resistance to the sliding of fingertips in one direction along its exposed surface as compared to sliding of fingertips in an opposite direction.

Thus, layer 30 is preferably molded of a plastic material to provide a series of inclined ramps 31 each of which includes a gradually inclined surface portion 32 which terminates abruptly but which is of sufficient length along the direction of strip 27 whereby a person touching the surface with his fingertips can determine the directional orientation of each ramp 31. Layer 30 carries a layer 33 of adhesive material, such as conventional pressure sensitive adhesive, whereby strip 27 is adapted to be adhered to an interior portion of the passenger compartment 20 within fuselage 11.

Other materials having the above described "unidirectional" tactile characteristic may include sealskin or cat's fur, for example.

As shown in FIGURE 1, strip 27 has been schematically indicated by directionally oriented hash marks. Thus, for example, a person located at position 28 can readily touch the strip and determine that the direction of "easy" resistance to sliding movement will lead him along aisle 24 to exit 17.

In the above manner, maximum utilization of all exits can be effected.

From the foregoing it will be readily apparent that the method of directing evacuation of a passenger compartment of a personnel carrier, such as an airplane, comprises the steps of disposing a strip of material in a path leading to an exit of the carrier and within ready reach of the passengers therein, where the strip of material comprises a type having a tactile exposed surface characteristic as above described. The surface characteristic, therefore, provides substantially greater resistance to sliding fingertip movement thereacross in one direction than in the opposite direction. In evacuating the aircraft, the passenger's fingertips slidingly engage the exposed surface of the strip and preferably the fingertips are moved in each of two opposite directions to determine the direction which presents the least sliding resistance. Finally the passenger proceeds in the last named direction while continuing to slide his fingertips along the strip.

Thus, the strip will lead the passenger to the nearest emergency exit.

While the present invention has been described with respect to its relationship within an aircraft fuselage, it will be readily apparent that shipboard passageways or other confined spaces providing personnel compartments can be similarly equipped to provide tactile guidance to personnel therein. Thus, for example, in a theatre, a guide strip of the type described above could be applied to the tops of the seats and along the outer walls of the building and in that manner lead to the emergency exits to take care of the situation in which a theatre might fill with smoke.

I claim:

1. An emeregency guide for forming a path adapted to direct personnel carried in a personnel carrier to evacuation stations thereof comprising a continuous length of material having one surface adapted to be secured to an interior surface portion of the carrier readily within reach of passengers within the carrier and extending directionally toward one of the evacuation stations, said material having another surface adapted to be exposed for touching by personnel within the carrier, tactile means at said exposed surface exposed to the touch of personnel within the carrier for indicating to the person's sense of touch the one of two opposite directions to be followed for evacuation of the carrier.

2. An emergency guide as defined in claim 1 wherein said tactile means comprises material having substantially greater resistance to the sliding of fingertips in one direction along its surface as compared to resistance in the sliding of fingertips therealong in an opposite direction.

3. An emergency evacuation guide system for directing personnel to evacuation stations of a personnel carrier comprising a personnel carrier having an interior compartment for accommodating personnel, means forming an exit from said compartment, a length of material adhered to an interior surface of the compartment readily within reach of personnel therein and extending continuously in the direction of said exit to define a path thereto, said material having an exposed surface adapted to be touched by the fingertips of personnel to guide them in said direction, said exposed surface having a substantially greater resistance to sliding fingertip contact therealong in a direction opposite to the first named direction than the resistance to sliding fingertip contact in the first named direction.

4. An emergency evacuation guide system according to claim 3 wherein said carrier comprises the fuselage of an airplane having seats therein separated by an aisle, luggage shelves extending along the interior of said fuselage above said seats and adjacent the aisle, said length of material being disposed to face said aisle along a portion of the shelves and readily within reach of personnel in said aisle.

5. The method of directing evacuation of a passenger compartment of a personnel carrier comprising the steps of disposing in a path leading to an exit of the carrier and within ready reach of the passengers therein a strip of material of the type having a tactile exposed surface characteristic providing substantially greater resistance to sliding fingertip movement thereacross in one direction than in the opposite direction, sliding a passenger's fingertips in engagement with the exposed surface of the strip in each of the two opposite directions to determine the direction presenting the least sliding resistance, and proceeding in the last named direction while continuing to slide the passenger's fingertips along the strip.

6. An emergency evacuation system for directing personnel to evacuation stations of a personnel carrier comprising a personnel carrier having an interior compartment for accommodating personnel, means forming an exit from said compartment, and means defining a path to the exit including a strip of material within ready reach of personnel within the compartment and having at its exposed surface means serving to present a substantially greater resistance to sliding fingertip contact therealong in a direction leading away from said exit than in a direction leading toward said exit.

7. A system according to claim 6 wherein the last named means comprises successive longitudinally distributed gradually inclined surface portions terminating abruptly at their inclined ends, said portions being of sufficient length along the direction of said strip to make readily identifiable by a person's sense of touch the directional orientation of said gradually inclined surface portions.

8. An emergency guide for forming a path adapted to direct persons within a compartment to an exit thereof comprising a continuous length of material having one surface adapted to be secured to an interior surface portion of the compartment disposed readily within reach of persons within the compartment and extending directionally toward one of the exits, said material having another surface adapted to be exposed for touching by persons within the compartment, tactile means at said exposed surface for indicating to a person's sense of touch the one of two opposite directions to be followed for evacuation of the compartment.

References Cited

UNITED STATES PATENTS 2,396,039  3/1946  Burton et al. _____ 244—118

MILTON BUCHLER, *Primary Examiner.*

T. W. BUCKMAN, *Assistant Examiner.*

Disclaimer 3,408,025.—*Burt L. Davis*, Palo Alto, Calif. EMERGENCY EVACUATION SYSTEM. Patent dated Oct. 29, 1968. Disclaimer filed Sept. 20, 1976, by the inventor.

Hereby enters this disclaimer to claims 1, 2, 3, 4, 5, 6 and 7 of said patent.

[*Official Gazette November 23, 1976.*]